Patented Dec. 15, 1942

2,305,480

UNITED STATES PATENT OFFICE

2,305,480

PRODUCTION OF CANNED MEATS FOR STORAGE

Stephen L. Komarik, Chicago, Ill., assignor to The Griffith Laboratories, Inc., Chicago, Ill., a corporation of Illinois No Drawing. Application July 18, 1941, Serial No. 402,945

13 Claims. (Cl. 99—157)

The present invention relates generally to the canning of meat and meat products, and particularly to hams, picnics, luncheon meats, spiced hams, Mortadella, and like products.

In my prior application Serial No. 399,233, filed June 21, 1941, I have described a process particularly with reference to such meats and meat products when the meat is raw. The present application is a continuation-in-part of and generic to said application, and introduces examples of the generic invention wherein the meat or meat base may vary from a raw to an incompletely cooked condition, or even be sufficiently cooked to be edible, but not sufficiently treated as to be stable in the canned condition to keep without refrigeration.

In the case of raw to incompletely cooked meat or meat products to be heated in a can to cook or condition the unit for keeping, it is important to avoid high temperatures for a long time, in order to limit purging of fats and juices from the meat with resultant shrinkage of the meat or contents of the can. When this occurs a gelatinous mass accumulates in the space between the shrunken contents and the can walls, which is unpleasant to view and commonly wasted by most consumers. In avoiding purging, a cooking process is used with limitation of time and temperature, with the result that such cooked products require refrigeration to assure a safe and merchantable condition. Such a process is described in my prior Patent No. 2,224,399.

The present invention is a further development of the principles involved in said earlier patent, to overcome the necessity for refrigerating the canned product while retaining the limited purging, and the improved flavoring by amino-acid development.

In said prior method the heating is conducted in such a way as to limit the extent and time of exposure of the surface layers to purging heat, while effecting a rapid and progressive increase of the temperature at the most remote part of the contents of the can, from a chill temperature of about 40° F. to a temperature in the range from 152° to 160° F. Such procedure is not sufficient to assure sterilization of the microorganisms which will produce spoilage, and particularly the thermophilic bacteria which become active at the higher normal temperatures where refrigeration is avoided. Such thermophilic bacteria require higher temperatures, as from 96° to 130° F., for their activity and growth.

The present invention has for an object a heat treatment of canned meat to avoid the necessity for refrigeration.

Another object is the limitation of purging in such heat treatment while cooking the contents originally in raw or incompletely cooked condition.

A particular object of the invention is to subject canned meat to a temperature which assures incubation of thermophilic, and hence other, bacteria, and then to heat the canned meat under conditions to assure killing the thermophilic and other bacteria.

Still another object of the invention is to effect in process, a flavoring development of amino acids.

Still another object of the invention is to expose the walls of the can containing the meat to be processed by the present invention, to heat of a temperature sufficient to generate steam within the can to effect a sterilization by steam, it being noted that this step is a joint invention of the applicant and of C. L. Griffith described and claimed in a co-filed application Serial No. 402,946, filed July 18, 1941, and more particularly referred to hereinafter.

Various other and ancillary objects and advantages of the invention will appear from the following description and explanation of the invention.

It is not difficult to cook meat to effect a thorough and complete sterilization. For example, a canned 10-lb. raw ham requires that it be subjected to a temperature of 230° F. for 5¾ hours, to be sterile. But this will result in 40% purging of fat and juices, rendering the whole meat unattractive, less nutritious and loose-fibered, with practical waste. Such an article is unsalable, at present day standards. Therefore, unsterile products are in demand today, not because unsterile, but because of appearance and of the limited purging which can be effected.

The conditions above given are the result of the use of a large can, and the requirement that the most remote part of the meat, so treated, must attain 212° F. and be so held for at least 15 minutes. This is because the dormant life, which is thus not allowed a favorable incubation period, requires a higher temperature for killing, than active living bacteria.

By the present invention conditions are imposed which will assure that dormant life awaken and enter the active phase, whereby it can then be killed by lower temperatures, while the meat is cooking under conditions to limit purging. One essential of this treatment is to avoid too long an exposure for awakening the dormant life, so that spoilage in the can is not effected. While doing this, it has been found that the changes in the meat partake of the nature of ripening, with favorable development of amino-acid flavor. Thus, sterile canned meat with greatly improved flavor is a result. Also, the meat has the appearance of the unsterilized products, is firm and whole, and devoid of mushiness and of tendency to fall apart.

Generally, the process has its last heating step effected on the meat product sealed in the can. Preferably the two major heating steps are carried out with the contents sealed in the can. However, there are practices which permit some of the steps to be carried out before the product is placed in the can, or before the product in the can has been sealed therein.

The sealing of the can may be accomplished by the procedure of mechanically evacuating the can through a vent hole and sealing the vent hole under vacuum. However, the preferred practice is to use the aforesaid joint invention of the applicant and of C. L. Griffith. According to this process, the closed can, provided with a vent hole, is subjected to an exposure temperature in the range from 250° to 400° F., preferably by immersion in an oil bath, with the vent hole exposed to the atmosphere. The immersion is temporary to avoid cooking the major contents of the can. When the temperature of an oil bath is 350° F., the time of immersion is from 7 to 10 minutes, part of this time being consumed by a period for a slow motion down into the bath, a period in the bath while substantially entirely immersed, and a period for a slow motion up out of the bath. This exposure generates steam in the can which blows as a jet from the vent hole carrying with it air and a mist of free moisture from the contents. The steam effects a sterilization of the surfaces of the contents to which the generated steam may penetrate, including all the interface between the contents and the can, and any folds or crevices or bone cavities on the interior of the contents. These are the parts most likely to be infected in handling the meat prior to closing the can.

The steam generation also blows out the air in the can, filling the void spaces with steam. As the steam subsides, and preferably before it ceases, the vent hole is soldered closed. On cooling the can will exhibit vacuum and be comparable in vacuum to a sealed mechanically exhausted can. The steam issuing at the vent hole sterilizes in its vicinity, and there is no danger of contamination at the vent hole in soldering it while steam pressure exists inside the can at the vent hole.

Furthermore, the temperature of the exposure to generate steam may be so high as to sear the surface of the contents, or to scorch it for producing a desired condition, for example, the taste and appearance of a baked ham. The preferred searing, or searing and scorching, temperature, is in the range from 345° to 400° F. In practice a control at 350° F. has been employed with permissible variations of 5° F. on either side in effecting the control.

The searing also seals together contacting edges or folds of the meat, through which otherwise, fats and juices may purge to the walls of the can. The searing in general closes the pores of the surface of the contents to form an envelope to resist passage of fats and juices in the tendency to purge, whereby the purging and the shrinkage are greatly minimized. These results are most prominent in the case of whole raw meat, and more so in the case of compounded products composed of small particles of meat.

The present invention may be practiced on meat or meat products which are raw, or incompletely cooked, or cooked. In any case, the contents may be sealed in the can by the old mechanical exhaustion, or by the generation of steam in the can as aforesaid. The sealing by either method is to be effected prior to the last heating stage of the presently described process.

As the process is applied to raw meat in the can, the meat is usually placed in the can from a chill room at about 40° F. If it is vacuum sealed immediately for the process, the contents will have an innermost temperature of about 40° F. If it is sealed immediately by the generation of steam, the remotest part will be raised but a few degrees, in the case of a ham, about 2° F. Then the can is subjected to a heating which does not cook the meat, but which brings all the meat upward in temperature through a range wherein thermophilic bacteria will be activated. The top activating temperature is in a range from 125° to 130° F. To effect this, the surrounding temperature to which the can is exposed is not over 150° F. during the major portion of the exposure time beginning preferably at 120° F., whereby the outer layers are first subjected to an activating range for thermophilic bacteria. The temperature of the surroundings may be gradually raised, or raised stepwise, to some limit not over 150° F. It is to be understood that for a temporary period the exposure temperature may go over 150° F., as for example when using a bath water at a temperature considerably above 150° F. to be cooled by immersion therein of cold cans to be heated, or for some other reason, accident or expedient.

In doing this, the outer layers will attain the exposure temperature while the more remote part is attaining the activating temperature. But the higher temperature of the outer layers will do no harm, because where it does not exceed 150° F. purging is minimized.

Practically, all this is effected by predetermined control. A liquid bath is used for holding the cans. The cans in the bath are preferably of the same size. By previous test with thermocouples in like cans, it can be determined how long the can must be immersed in one or more baths of controlled temperatures for controlled times, to effect at the remotest part of each can a temperature between 125° and 130° F.

Thereafter, the cans are removed and placed in a cooler, with an air environment at a chill temperature of about 40° F. as for example 42° F. The longer the time or the smaller the can, the lower will the temperature of the remotest part fall. The exact time and temperature are not material, because as it cools, activity is arrested without the bacteria becoming dormant. However, since a subsequent cooking step is likewise effected by use of a predetermined control, it is preferred that the chill room be at a controlled temperature, and that each size of can be left in the chill room for a predetermined time, if the time is so short that the remote part is still cooling. An example hereinafter given will explain this more in detail. The chilling may continue until the whole contents attain the chill temperature. The chilling extends at least long enough to cool the remote part to not over 65° F. This is significant only to assure a time period to develop flavor.

Then the can is cooked, using a procedure which will not heat too highly the outer layers, thus to minimize purging, until the remote part has attained at least 160° F. This may be done more quickly by first exposing the can to a temperature not higher than 180° F. during the major part of the exposure period, such as one beginning at 175° F., and cooling the exposure temperature to about 165° F. or even lower, until the remote part attains a temperature of 160° F. or higher, but not over 170° F., to limit purging. It is to be understood that for a temporary period the exposure temperature may go over 180° F., as for example, when using a bath water at a temperature considerably above 180° F., such as at 212° F., to be cooled by immersion therein of cold cans to be heated, or for some other reason, accident or expedient.

Then the hot can may be chilled, as by immersion in running water, to arrest purging and to set the fats and juices in the contents, and quickly to lower the temperature to minimize effects of continued cooking while cooling. The chilled can may be kept in a chill room for a few days more firmly to set the fat and juices in the tissues of the meat.

The process may be carried out on beef, pork, ham, tongue, and various cuts of whole meat of any kind. It is preferred that bones be removed. Such removal is conducive to forcing the meat under high pressure into the can to fill it with the avoidance of voids. Voids collect purged matter, and also insulate in the cooking process. Ham and other pork products are favorites in the canned field, as whole meats, ground meats, spiced or not, and in compounded form, for luncheon and sandwich slices. The prior pickling or curing of such products with table salt, curing salt, sugar and the like, together with the large content of normal fat, render such products more subject to purging of watery juices and fat, than many other meats. Therefore, the process is particularly adaptable to such products, but not limited thereto.

The following formulas indicate meat compounds useful in the present invention.

FORMULA No. 1

Fresh pork trimmings are ground in part through a ⅛-inch plate, and in part through a ⅜-inch plate. Sodium chloride, spice, and curing salt are mixed with the ground meat in a vacuum mixer for 10 minutes, and then the mass is cooled to 34° F., for curing over night. Then the mass is mixed again in a vacuum mixer for 5 minutes, and stuffed into oblong No. 3 cans, to be sealed by mechanical vacuum at 27 inches, ready for processing, or to be sealed by generation of steam in the can as hereindescribed, at a suitable stage in the process.

FORMULA No. 2

Hams are cured with 10% brine of salimeter strength from 79° to 90°.

FORMULA No. 3.—LUNCHEON MEAT

| | | |
|---|---|---|
| Ground beef | pounds | 60 |
| Ground pork | do | 40 |
| Sodium chloride | do | 3½ |
| Curing salt | ounces | 4 to 6 |
| Sugar and seasonings | | To taste |

FORMULA No. 4.—MORTADELLA

| | | |
|---|---|---|
| Coarse chopped beef or pork, alone or mixed | pounds | 100 |
| Sodium chloride | do | 3¼ |
| Curing salt | ounces | 4 to 6 |
| Sugar and seasonings | | To taste |

In carrying out the invention in practice, care is taken, as always, to select high grade clean raw meat, whether whole, or ground for compounded contents. Thus, in the case of whole hams, they are selected fresh from the cutting floor, usually at a temperature of 36° to 40° F. They are artery-pumped with pickle brine of 42° F. temperature, in a well known manner. Where a 79-degree salimeter pickle is used, 10% of such pickle is sufficient based on the weight of the ham. They are then dry-rubbed with curing salt and placed in a curing cellar at 36° F. for six days. Then they are lightly washed with luke warm water, boned, trimmed, and pressed into a can as boneless hams. Apparatus according to Komarik Patent No. 2,224,398, and Griffith patent No. 2,224,908, may be used. The cans are then vacuum sealed at 27 inches of vacuum, when they are ready for processing. The cans are divided into groups according to exact or close can sizes, as provided for different weights of ham.

To illustrate the invention, and how the control of the process is determined, the following examples are given, covering test cans in which thermo-couples are inserted to read the temperature at the remotest part of the can. The following cases are given:

No. 1, ham weight_____pounds__ 11
No. 2, ham weight_____do____ 9¹⁰⁄₁₆

*Example 1.—Raw meat*

The cans are closed upon the meat taken from the chill room with the provision of a vent hole. The cans directly, or after standing a short while to lose the surface chill, are immersed in an oil bath of 350° F. to generate steam, as above described, and the vent hole is soldered while steam emerges.

The cans are placed in a cooking vat in water, the temperature of which is controlled as given in Table 1. The time is recorded. The inside temperature is recorded, and these data are coordinated as in Table 1. Slight differences in temperature result from the difference in sizes of the cans.

TABLE I

| Minutes | Water temp. °F. | Internal temp. No. 1 ham °F. | Internal temp. No. 2 ham °F. |
|---|---|---|---|
| Start | 120 | 42 | 42 |
| 15 | 120 | 46 | 46 |
| 30 | 120 | 50 | 50 |
| 45 | 120 | 55 | 55 |
| 60 | 120 | 60 | 60 |
| 75 | 120 | 63 | 66 |
| 90 | 120 | 68 | 72 |
| 105 | 120 | 73 | 76 |
| 120 | 120 | 78 | 81 |
| 135 | 120 | 84 | 86 |
| 150 | 120 | 88 | 90 |
| 165 | 130 | 92 | 95 |
| 180 | 130 | 98 | 99 |
| 195 | 130 | 99 | 101 |
| 210 | 130 | 102 | 105 |
| 225 | 140 | 104 | 107 |
| 240 | 140 | 108 | 110 |
| 255 | 140 | 112 | 115 |
| 270 | 140 | 114 | 116 |
| 285 | 150 | 118 | 120 |
| 300 | 150 | 120 | 122 |
| 315 | 150 | 122 | 124 |
| 330 | 150 | 125 | 127 |
| 345 | 150 | 127 | |

The cans are then taken from the water bath and placed in a chill room of 40° to 42° F., or thereabouts. For the report here given it was at 42° F. After 16 hours the cooking period was started, at which time the internal temperatures were those shown at the start in Table 2.

TABLE II

| Minutes | Water temp. | Internal temp. No. 1 ham | Internal temp. No. 2 ham |
|---|---|---|---|
| | °F. | °F. | °F. |
| Start | 175 | 61 | 60 |
| 15 | 175 | 57 | 56 |
| 30 | 175 | 56 | 56 |
| 45 | 175 | 64 | 64 |
| 60 | 175 | 70 | 72 |
| 75 | 175 | 78 | 80 |
| 90 | 175 | 87 | 87 |
| 105 | 175 | 95 | 95 |
| 120 | 175 | 102 | 102 |
| 135 | 175 | 108 | 108 |
| 150 | 175 | 115 | 115 |
| 165 | 175 | 122 | 122 |
| 180 | 167 | 130 | 130 |
| 195 | 167 | 132 | 132 |
| 210 | 167 | 140 | 140 |
| 225 | 167 | 143 | 143 |
| 240 | 167 | 146 | 146 |
| 255 | 167 | 148 | 148 |
| 270 | 167 | 150 | 150 |
| 285 | 167 | 152 | 152 |
| 300 | 167 | 154 | 154 |
| 315 | 167 | 156 | 156 |
| 330 | 167 | 158 | 158 |
| 345 | 167 | 159 | 159 |
| 360 | 167 | 160 | 160 |

Immediately, the cans are placed in cold running water of 42° F. for 2 hours, then kept in a cooler at 36° F. for two days to set juices in the tissue. The cans may be normally cooled from the cooking, to room temperature, without such chilling, but the appearance and character of the product is much improved by the chilling.

The cooked cans may then be kept without refrigeration, with no spoilage. Spoilage is evidenced by gas pressure blowing up the cans in due time.

*Example 2*

Spiced luncheon meat according to Formula No. 1 given above, in No. 3 oblong cans equipped with thermo-couples, are processed by the same procedure as in Example 1, with the following comparable results:

TABLE III

| Minutes | Water temp. | Internal temp. |
|---|---|---|
| | °F. | °F. |
| 15 | 120 | 53 |
| 30 | 120 | 62 |
| 45 | 120 | 72 |
| 60 | 120 | 82 |
| 75 | 120 | 90 |
| 90 | 120 | 96 |
| 105 | 120 | 102 |
| 120 | 130 | 107 |
| 135 | 130 | 112 |
| 150 | 130 | 115 |
| 165 | 130 | 121 |
| 180 | 140 | 122 |
| 195 | 140 | 125 |
| 210 | 140 | 129 |

The cooling practice of Example 1 is followed, then the cooking is started.

TABLE IV

| Minutes | Water temp. | Internal temp. |
|---|---|---|
| | °F. | °F. |
| 15 | 167 | 48 |
| 30 | 167 | 68 |
| 45 | 167 | 88 |
| 60 | 167 | 107 |
| 75 | 167 | 121 |
| 90 | 167 | 132 |
| 105 | 167 | 140 |
| 120 | 167 | 148 |
| 135 | 167 | 152 |
| 150 | 167 | 156 |
| 165 | 167 | 160 |
| 180 | 167 | 160 |

The chilling in water, then in a cooler, is practiced as in Example 1.

THE PRODUCT

In Examples 1 and 2, the product on opening is little purged, solid, and of excellent appearance to slice or serve directly. It has a superior taste and ripened flavor resulting from amino acid development. The products have been kept at ordinary room temperature of 75° to 80° F. in winter and 90° F. in summer, for a period of 5 months, and on opening are unchanged in taste, quality and appearance.

In the foregoing examples it is to be understood that the first heating, or the chilling thereafter, may be conducted while the vent hole is open, care being taken preferably of course, that in the heating the vent hole is protected from entry of bath water or fluid into the hole. It may be sealed by mechanical evacuation or by steam generation, either after the first heating, or after the chilling between the heatings, but before the final heating. Of course, all elements of due caution dictate sealing the vent hole before the first heating and by the generation of steam.

*Example 3.—Incompletely cooked meat*

It is a practice in minimizing the results of purging in a can, to cook meat wholly or incompletely outside of the can, then to can it and heat or finish the cooking, whereby the shrinkage results before entry into the can. This is best illustrated by the old practice with hams:

Hams, preferably boned, are placed in a ham container. Ham containers have the shape of the can which is to receive the ham, and have also a flat pressure platen on top of the ham to force it into the container and to mold it to fit the can. These are then immersed in a water bath to effect a cooking to permit the purging and shrinkage to occur in the container. Then the ham is transferred to the can and sealed, and processed by heat again to pasteurize the surface or to complete the cooking, or both.

This general practice is applicable to the present invention as follows:

A raw boned ham is placed in a ham container as above described, and the container is immersed in a water bath having a temperature in the range from 120° to 150° F. during the major portion of the exposure period, preferably increasing from 120° to 150° F., until the coldest part of the ham attains a temperature in the range from 125° to 130° F. Then the ham, in the container, or out of the container, or closed in a can with its vent hole open, is placed in a chill room, for example for over night at about 40° F., until the warmest part of the ham is at a temperature of not over 65° F. Then the can is subjected to a temperature, as in an oil bath, in the range from 250° to 400° F., in accordance with the present invention, and preferably in the range from 345° to 400° F., to effect searing or scorching of the ham surface. Thus, sterilizing steam is generated to kill organisms as described, especially any infection received in transferring the ham from the ham container to the can. The steam blows out air entrapped in the can and also some excess moisture. Then the vent-hole is sealed. At this point, only the surface of the contents has been highly heated in the treatment to generate steam, and the interior is still incompletely cooked. The sealed can is then subjected to an exposure temperature in the range from 180° to 165° F. during the major portion of the exposure period, such as one decreasing from 170° to 165° F., until the coldest part of the contents attains a temperature of at least 160° F. and not over 170° F.

It is to be understood that these two exposure temperatures may for a short time be above said 150° F. or the said 180° F. temporarily, as for example by using initially a hotter bath water, such as at 212° F. to be cooled by immersion of the cold cans, or for some other reason, accident, or expedient.

A modification of the above procedure is to can the ham immediately as taken from the ham container after the immersion cooking, and to subject the can to a steam generating heat, whereby to permit sealing the can before placing it in the chill room.

The heating of the ham in the ham container need not be effected by immersion of the whole in water. Only the body of the container may be immersed, whereby at the end of the process, the purged juices may be separated from the shrunken ham.

In the above general or modified example, the searing to resist purging is not a major objective, because the heating of the ham in the can releases the purged juices from the meat, and when the meat is canned it is already shrunken as a result of such purging.

Although the above described example is referred to a ham, it is to be appreciated that the same principles and controls may be used for corned beef, tongue, and other whole meats, luncheon meats, compounded meats and loaves and the like.

Example 4.—Cooked meats

A composition such as Formulas Nos. 1, 3 or 4 is formed into a loaf and cooked to a can-shape in a mold to the extent that it is edible. The loaf is transferred to a can sealed with the provision of a vent hole. The cooking will have surpassed the temperature of the first step (range 125° to 130° F.), but this consideration is neglected, because there may be contamination after the cooking and before canning. For the purpose of control, the canned loaf is chilled to the temperature of a chill room and then heated by exposure to a temperature of 120° to 150° F. during the major portion of the exposure period, until the remote part of the contents attains a temperature in the range from 125° to 130° F. Then the can is cooled until the warmest part is not over 65° F. Up to this point the vent hole may be open, but preferably it is closed, and preferably closed by generating steam in the can and soldering, said processing being done preferably immediately after canning the cooked loaf. However, the modified procedures of Example 1 are also applicable here.

Then the sealed can is subjected to an exposure temperature in the range from 180° to 165° F. during the major portion of the exposure period, such as one decreasing from 175° to 165° F. until the remotest part of the contents attains a temperature of at least 160° F. and not over 170° F.

The invention is of great value in providing for economic storage and transportation of food. In times of plenty, reserves may be accumulated with avoidance of refrigeration expense. It is obviously of great value for homes, campers, armies, and for export business.

Herein, where the terms "raw ham" or "raw meat" are used, this includes cured meat, whether cured by brine or smoke, or both.

The invention is subject to modification in many ways as to control, without departing from the spirit and scope of the invention as set forth in the appended claims.

I claim:

1. The method of producing a canned meat product which comprises heating a meat mass from a temperature well below 125° F. by exposure to a temperature not in excess of 150° F. during the major portion of the exposure period until the remote and coldest part of the mass attains a temperature in the range from 125° to 130° F. whereby organic life in the meat mass will have been exposed to favorable conditions for incubation to bring such life out of any dormant state without necessarily exterminating all organic life in the meat mass, subjecting the meat mass to a chill temperature of about 40° F. until the warmest part of the meat mass cools to a temperature not over 65° F. whereby to favor the development of amino acid flavor, and then heating the mass while vacuum sealed in a can by exposure of the can to a temperature not in excess of 180° F. during the major portion of the exposure period until the coldest part of the contents of the can attains a temperature of at least 160° F. and not over 170° F.

2. The method of producing a canned meat product which comprises heating a meat mass from a temperature well below 125° F. by exposure to a temperature not in excess of 150° F. during the major portion of the exposure period until the remote and coldest part of the mass attains a temperature in the range from 125° to 130° F., whereby organic life in the meat mass will have been exposed to favorable conditions for incubation to bring such life out of any dormant state without necessarily exterminating all organic life in the meat mass, subjecting the meat mass to a chill temperature of about 40° F. until the warmest part of the meat mass cools to a temperature not over 65° F. whereby to favor the development of amino acid flavor, and then heating the mass while vacuum sealed in a can by exposure of the can to a temperature not in excess of 180° F. during the major portion of the exposure period until the coldest part of the contents of the can attains a temperature of at least 160° F. and not over 170° F., and after the mass is placed in the can exposing the can with an open vent hole to a temperature in the range from 250° to 400° F. with the avoidance of substantially increasing the temperature of the most remote portion of the contents of the can, whereby to generate sterilization steam in the can and to blow air, steam and mist through the vent hole, and sealing the vent hole while steam pressure exists inside the can at the vent hole, whereby the steam in the can and the lack of air in the can create a vacuum in the cold canned product.

3. The method of producing a canned meat or meat product which comprises heating a meat mass from a temperature well below 125° F. by exposure to an increasing temperature in the range from 120° to 150° F. during the major portion of the exposure period until the remote and coldest part of the meat mass attains a temperature in the range from 125° to 130° F., whereby organic life in the meat mass will have been exposed to favorable conditions for incubation to bring such life out of any dormant state without necessarily exterminating all organic life in the meat mass, subjecting the meat mass to a chill temperature of about 40° F. until the warmest part of the meat cools to a temperature not over 65° F. whereby to favor the development of amino acid flavor, and then heating the mass while vacuum-sealed in a can by exposure of the can to a decreasing temperature in the range from 180° to 165° F. during the major portion of the exposure period until the coolest part of the contents of the can attains a temperature of at least 160° F. and not over 170° F.

4. The method of producing a canned meat or meat product which comprises heating a meat mass from a temperature well below 125° F. by exposure to an increasing temperature in the range from 120° to 150° F. during the major portion of the exposure period until the remote and coldest part of the meat mass attains a temperature in the range from 125° to 130° F., whereby organic life in the meat mass will have been exposed to favorable conditions for incubation to bring such life out of any dormant state without necessarily exterminating all organic life in the meat mass, subjecting the meat mass to a chill temperature of about 40° F. until the warmest part of the meat mass cools to a temperature not over 65° F. whereby to favor the development of amino acid flavor, and then heating the mass while vacuum-sealed in a can by exposure of the can to a decreasing temperature in the range from 180° to 165° F. during the major portion of the exposure period until the coolest part of the contents of the can attains a temperature of at least 160° F. and not over 170° F., and after the mass is placed in the can exposing the can with an open vent hole to a temperature in the range from 250° to 400° F. with the avoidance of substantially increasing the temperature of the most remote portion of the contents of the can, whereby to generate sterilizing steam in the can, and to blow air, steam and mist through the vent hole, and sealing the vent hole while steam pressure exists inside the can at the vent hole, whereby the steam in the can and the lack of air in the can create a vacuum in the cold canned product.

5. The method of producing a canned cooked meat product which comprises heating a raw meat mass from a temperature well below 125° F. by exposure to a temperature not in excess of 150° F. during the major portion of the exposure period until the most remote and coldest part of the mass attains a temperature in the range from 125° to 130° F., chilling the mass by exposure to a temperature of about 40° F. until the remotest part of the mass has cooled to not over 65° F., and then heating the mass in a vacuum sealed can by exposure of the can to a temperature not over 180° F. during the major portion of the exposure period until the remotest part of the can attains a temperature of at least 160° F. and not over 170° F.

6. The method of producing a canned cooked meat product which comprises heating a raw meat mass from a temperature well below 125° F. by exposure to a temperature not in excess of 150° F. during the major portion of the exposure period until the most remotest and coldest part of the mass attains a temperature in the range from 125° to 130° F., chilling the mass by exposure to a temperature of about 40° F. until the remotest part of the mass has cooled to not over 65° F., and then heating the mass in a vacuum sealed can by exposure of the can to a temperature not over 180° F. during the major portion of the exposure period until the remotest part of the can attains a temperature of at least 160° F. and not over 170° F., and after the mass is placed in the can exposing the can with an open vent hole to a temperature in the range from 250° to 400° F. with the avoidance of substantially increasing the temperature of the most remote portion of the contents of the can, whereby to generate sterilizing steam in the can and to blow air, steam and mist through the vent hole, and sealing the vent hole while steam pressure exists inside the can at the vent hole, whereby the steam in the can and the lack of air in the can create a vacuum in the cold canned product.

7. The method of producing a canned meat product which comprises closing a raw meat mass in a can with the provision of a vent hole, exposing the can to a temperature in the range from 250° to 400° F. whereby to generate in the can sterilizing steam and to blow steam, air and mist through the vent hole, the exposure being with the avoidance of attaining any substantial increase in temperature for the most remote portion of the contents of the can, sealing the vent hole while steam pressure exists in the can at the vent hole, exposing the sealed can to a temperature not in excess of 150° F. during the major portion of the exposure period until the most remote and coldest part of the contents of the can attains a temperature in the range from 125° to 130° F., exposing the can to a chill temperature until the warmest part of the contents of the can is not over 65° F., exposing the can to a temperature not in excess of 180° F. during the major portion of the exposure period until the coldest part of the contents attains a temperature of at least 160° F. and not over 170° F.

8. The process of producing a canned meat product which comprises cooking a raw meat mass in a mold to shape it to fit a can by exposure to a temperature of not over 150° F. during the major portion of the exposure period until the coldest part of the mass attains a temperature in the range from 125° to 130° F., subjecting the mass to a chill temperature of about 40° F. until the warmest part of the mass attains a temperature of not over 65° F., exposing the mass in a vacuum sealed can to a temperature not in excess of 180° F. during the major portion of the exposure period until the mass attains a temperature of at least 160° F. and not over 170° F.

9. The process of producing a canned meat product which comprises cooking a raw meat mass in a mold to shape it to fit a can by exposure to a temperature of not over 150° F. during the major portion of the exposure period until the coldest part of the mass attains a temperature in the range from 125° to 130° F., subjecting the mass to a chill temperature of about 40° F. until the warmest part of the mass attains a temperature of not over 65° F., exposing the mass in a vacuum sealed can to a temperature not in excess of 180° F. during the major portion of the exposure period until the mass attains a temperature of at least 160° F., and not over 170° F., and after the mass is placed in the can exposing the can with an open vent hole to a temperature in the range from 250° to 400° F. with the avoidance of substantially increasing the temperature of the most remote portion of the contents of the can, whereby to generate sterilizing steam in the can, and to blow air, steam and mist through the vent hole, and sealing the vent hole while steam pressure exists inside the can at the vent hole, whereby the steam in the can and the lack of air in the can create a vacuum in the cold canned product.

10. The process of producing a canned meat product which comprises cooking a raw meat mass in a mold to shape it to fit a can by exposure to a temperature of not over 150° F. during the major portion of the exposure period until the coldest part of the mass attains a temperature in the range from 125° to 130° F., subjecting the mass to a chill temperature of about 40° F. until the warmest part of the mass attains a temperature of not over 65° F., exposing the mass in a vacuum sealed can to a temperature not in excess of 180° F. during the major portion of the exposure period until the mass attains a temperature of at least 160° F., and not over 170° F., and after the mass is placed in the can exposing the can with an open vent hole to a temperature in the range from 345° to 400° F. with the avoidance of substantially increasing the temperature of the most remote portion of the contents of the can, whereby to generate sterilizing steam in the can, and to blow air, steam and mist through the vent hole, and sealing the vent hole while steam pressure exists inside the can at the vent hole, whereby the steam in the can and the lack of air in the can create a vacuum in the cold canned product, the temperature of exposure to the steam-generating heat effecting a searing of the surfaces of the contents of the can.

11. The process of producing a canned meat product which comprises exposing a cooked meat mass at a temperature well below 125° F. to a temperature not in excess of 150° F. during the major portion of the exposure period until the coldest part of the mass attains a temperature in the range from 125° to 130° F., exposing the mass to a chill temperature of about 40° F. until the warmest part of the mass cools to a temperature not over 65° F., exposing the mass in a vacuum-sealed can to a temperature not in excess of 180° F. during the major portion of the exposure period until the coldest part of the mass attains a temperature of at least 160° F. and not over 170° F.

12. The process of producing a canned meat product which comprises exposing a cooked meat mass at a temperature well below 125° F. to a temperature not in excess of 150° F. during the major portion of the exposure period until the coldest part of the mass attains a temperature in the range from 125° to 130° F., exposing the mass to a chill temperature of about 40° F. until the warmest part of the mass cools to a temperature not over 65° F., exposing the mass in a vacuum-sealed can to a temperature not in excess of 180° F. during the major portion of the exposure period until the coldest part of the mass attains a temperature of at least 160° F. and not over 170° F., and after the mass is placed in the can exposing the can with an open vent hole to a temperature in the range from 250° to 400° F. with the avoidance of substantially increasing the temperature of the most remote portion of the contents of the can, whereby to generate sterilizing steam in the can, and to blow air, steam and mist through the vent hole, and sealing the vent hole while steam pressure exists inside the can at the vent hole, whereby the steam in the can and the lack of air in the can create a vacuum in the cold canned product.

13. The method of canning ham which comprises closing a raw boned ham in a can with the provision of a vent hole, exposing the can to a temperature in the range from 250° to 400° F. with the avoidance of cooking the major portion of the ham, whereby to generate a sterilizing steam in the can and to blow air and steam out the vent hole, sealing the vent hole while a steam pressure exists in the can at the vent hole, exposing the can to a temperature not in excess of 150° F. during the major portion of the exposure period until the coldest part of the contents attains a temperature in the range from 125° to 130° F., exposing the can to a chill temperature of about 40° F. until the warmest part of the ham cools to a temperature of not over about 65° F., exposing the can to a temperature of not over 180° F. during the major portion of the exposure period until the coldest part of the ham attains a temperature of at least 160° F. and not over 170° F.

STEPHAN L. KOMARIK.